United States Patent [19]
Pollock

[11] 3,958,386
[45] May 25, 1976

[54] BUILDING STRUCTURAL SYSTEM

[76] Inventor: Eugene B. Pollock, 116 N. Mary St., Assumption, Ill. 62510

[22] Filed: Aug. 15, 1975

[21] Appl. No.: 604,945

Related U.S. Application Data

[63] Continuation of Ser. No. 458,760, April 8, 1974, abandoned.

[52] U.S. Cl. ............................................... 52/488; 46/29; 52/489; 52/656; 52/700; 52/758 A; 52/758 D; 52/758 H; 403/244; 403/384
[51] Int. Cl.² ...................................................... E04B 2/60
[58] Field of Search .............. 52/488, 489, 492, 476, 52/758 H, 758 G, 758 D, 758 A, 753 G, 361, 362, 363, 700, 648, 656, 699, 715; 46/29; 403/345, 384, 244, 263

[56] References Cited
UNITED STATES PATENTS

| | | | |
|---|---|---|---|
| 772,662 | 10/1904 | Mallory | 52/363 |
| 1,193,975 | 8/1916 | Beardsley | 46/19 X |
| 1,718,230 | 6/1929 | Graves | 46/29 |
| 1,893,636 | 1/1933 | Ridgway | 52/721 X |
| 1,971,881 | 8/1934 | Tinnerman | 24/90 E X |
| 2,159,666 | 5/1939 | Lotz | 52/758 A |
| 2,848,758 | 8/1958 | Chisholm | 52/364 |
| 2,911,242 | 11/1959 | Bickerstaff, Jr. | 52/758 H X |
| 3,429,090 | 2/1969 | Metelnick | 52/489 X |
| 3,831,333 | 8/1974 | Nelsson | 52/758 H X |

FOREIGN PATENTS OR APPLICATIONS

| | | | |
|---|---|---|---|
| 703,967 | 2/1954 | United Kingdom | 403/169 |
| 235,552 | 9/1964 | Austria | 52/656 |
| 866,234 | 4/1961 | United Kingdom | 52/364 |
| 980,397 | 1/1965 | United Kingdom | 52/489 |

*Primary Examiner*—Ernest R. Purser
*Assistant Examiner*—Leslie A. Braun
*Attorney, Agent, or Firm*—Wegner, Stellman, McCord, Wiles & Wood

[57] ABSTRACT

A building structural system having a plurality of preformed elongate structural elements each with a plurality of angularly-related planar surfaces and provided with integral fastener-receiving and locking devices and a plurality of connecting members for interconnecting said elongate elements in a desired angular relation and securing the elements with the addition of strength to the structural system.

5 Claims, 12 Drawing Figures

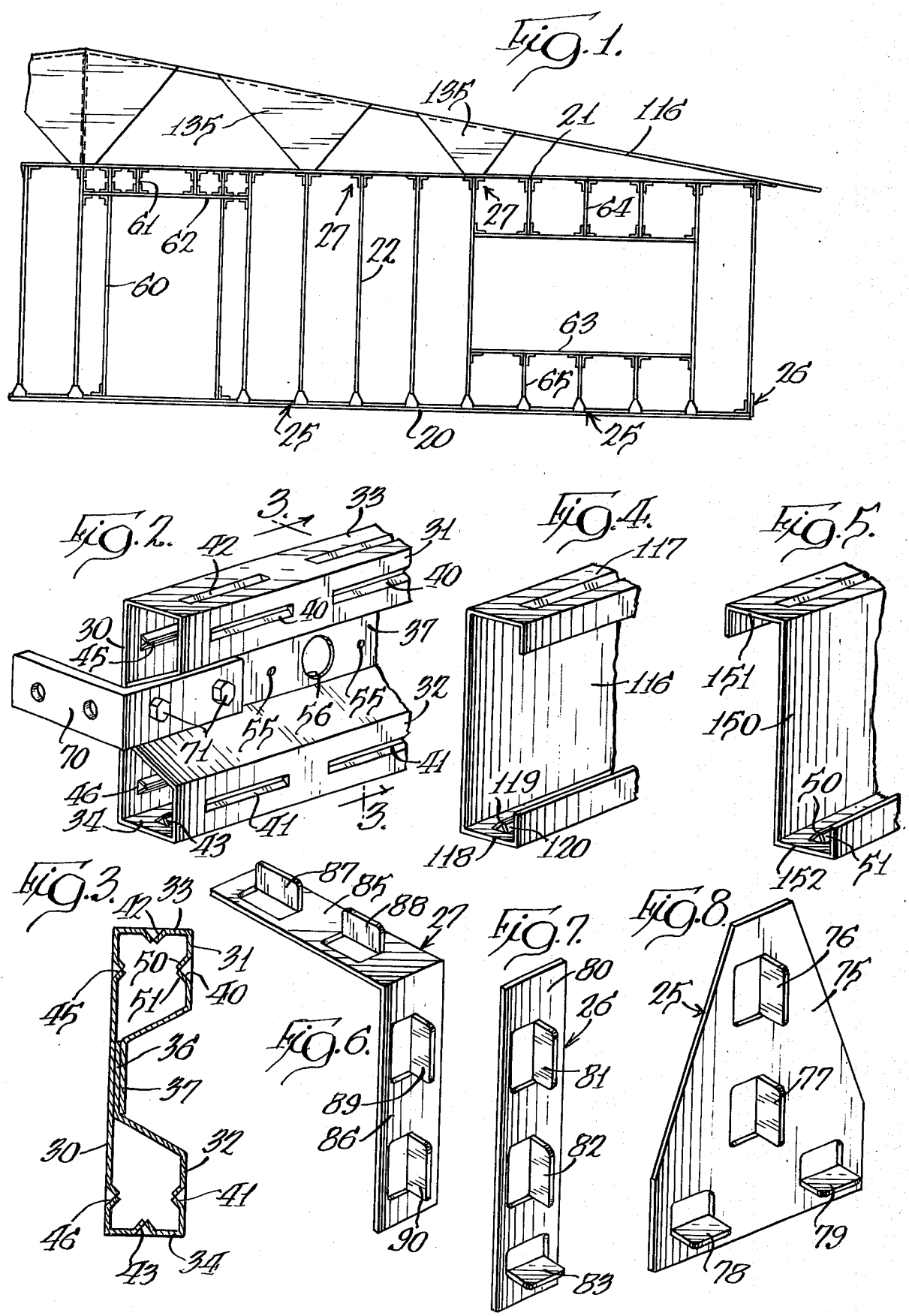

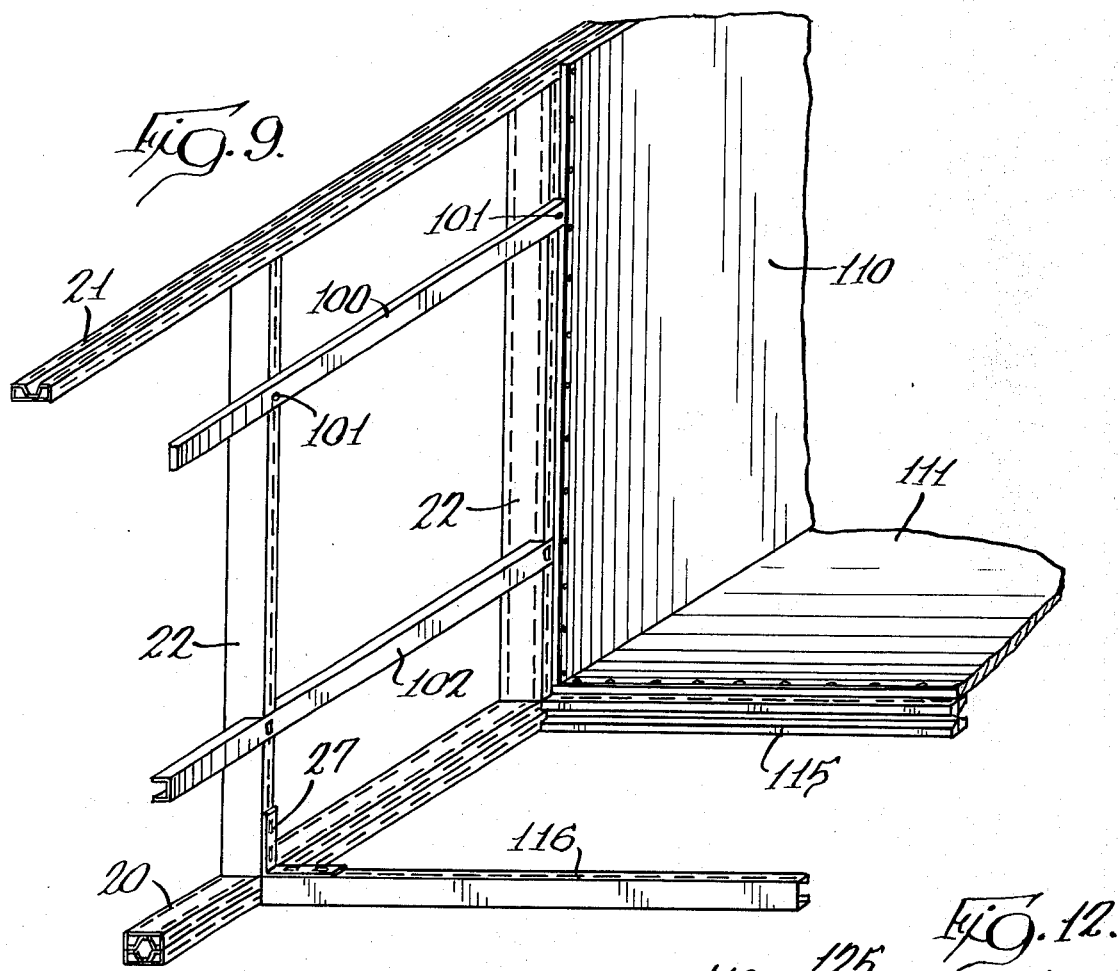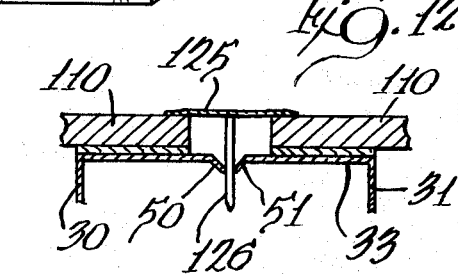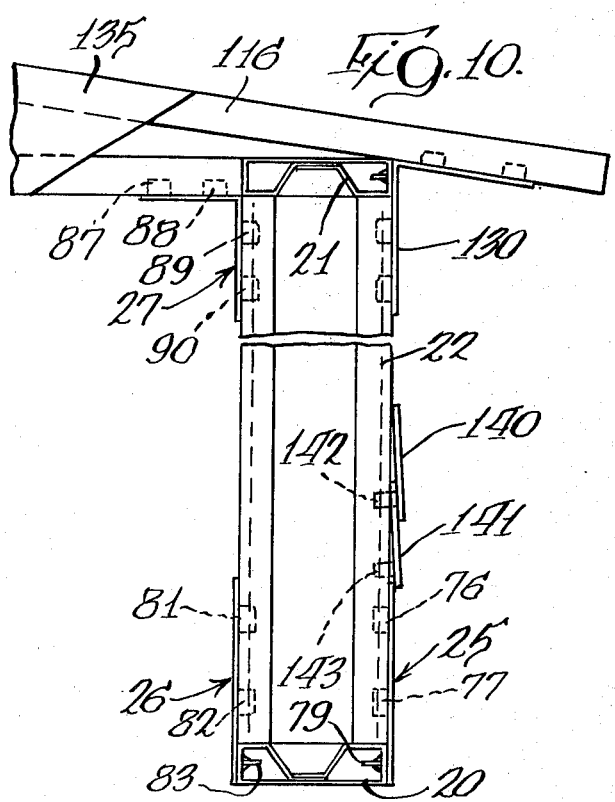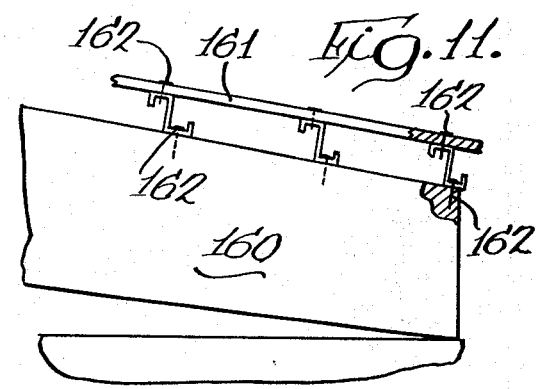

BUILDING STRUCTURAL SYSTEM

This is a continuation of application Ser. No. 458,760 filed Apr. 8, 1974, now abandoned.

BACKGROUND OF THE INVENTION

This invention pertains to a building structural system having structural elements which are predimensioned and designed with predetermined strength characteristics and with locking structure for securing the elements in fixed relation including integral locking components formed on the elements and interconnecting members including projecting planar tabs and locking slot structure for receiving the tabs.

Most residential and small commercial buildings are normally composed primarily of wood framing structure including studs, joists, and rafters. Various nonwood components have been offered for use in a typical structure to at least, in part, replace use of wood elements. Also there have been efforts to build prefabricated structures of materials other than wood having modular components. None of these systems known to applicant provide structural elements of material other than wood which can be used as conventional elements of a building and which may be prefabricated and predimensioned and self-fastening through integral fastening structures and which further enable both exterior and interior finishing of the building in the same manner as now accomplished in a conventional wood framed building.

SUMMARY

A primary feature of this invention is to provide a building structural system utilizing predimensioned elements of predetermined strength which are provided with structure for assuring proper alignment and integral fastening with other elements of the structural system while still permitting design flexibility with the use of conventional building materials and methods.

As part of the invention, the structural elements include elongate members formed from sheet material and to cross sections having strength and with the required total strength thereof being controllable by the gauge of sheet material used. The elements are provided with a spaced series of locking devices along the length thereof and formed integrally therewith for receiving integral fasteners carried on other members which hold the elongate elements in the desired interrelation and with the members having several different configurations depending upon the location of use.

Additionally, the locking devices and fasteners described above are simply formed integrally in the elements and members with the locking devices each being in the form of a pair of deformed flanges extending angularly toward each other and with their free ends closely adjacent whereby a fastener, in the form of a planar tab extending out from a member, may be inserted between the free ends of the flanges and retained therein against removal.

Still another feature of the invention is the adaptability of the framing elements of the building structural system for receiving both interior and exterior finish materials either by the use of the integral fasteners or by conventional securing means, such as nails, and with adaptation of the elements to accommodate passage of electrical conduit therethrough or attachment of furring strips thereto.

BRIEF DESCRIPTION OF THE DRAWINGS

FIG. 1 is a fragmentary elevational view of the building structural system used in framing a building wall and roof;

FIG. 2 is a fragmentary perspective view of one of the elongate structural elements used in the system and with a fastening member shown in association therewith;

FIG. 3 is a vertical section of the structure shown in FIG. 2 and taken generally along the line 3—3 in FIG. 2;

FIG. 4 is a fragmentary perspective view of another of the elongate structural elements;

FIG. 5 is a fragmentary perspective view of an additional form of elongate structural element;

FIG. 6 is a perspective view of one of the members for interconnecting structural elements;

FIG. 7 is a perspective view of a second form of interconnecting member;

FIG. 8 is a perspective view of a third form of interconnecting member;

FIG. 9 is a fragmentary perspective view of a portion of a building interior with part of the framework shown with interior finish material associated therewith;

FIG. 10 is a view on an enlarged scale of a building wall and a portion of a roof associated therewith and with parts broken away;

FIG. 11 is a fragmentary elevational view showing use of one of the elongate structural element shapes in a roof construction; and FIG. 12 is a fragmentary view showing a fastening device for associating finish materials with a structural element.

DESCRIPTION OF THE PREFERRED EMBODIMENT

The building structural system is shown in forming the framing of a conventional type building particularly in FIGS. 1, 9 and 10. The framing includes a sill 20 and a plate 21 with a series of studs 22 extended vertically therebetween. These framing elements are held in an angularly interrelated relation by a series of members, indicated generally at 25, 26, and 27.

Each of the framing elements 20, 21 and 22 is formed from a basic shape, shown particularly in FIGS. 2 and 3, wherein a sheet of material, such as metal, may be formed into a structural shape having a box cross-section. This basic structural element has a full width planar panel 30 with a pair of planar panels 31 and 32 in spaced parallel relation to the full width panel and a pair of interconnecting planar panels 33 and 34. The edges of the original sheet material, identified at 36 and 37, define a multilayer central section extending lengthwise of the element and are secured to each other as well as a part of the full width panel 30 by suitable means, such as welding or mechanically-clinching these parts together. The interior of the element permits lengthwise passage of conduit and may be foam-filled for insulation.

Each of the planar panels of the element is provided with a series of integral fastener-receiving and locking devices uniformly spaced apart along the length thereof. The planar panels 31 and 32 have the locking devices 40 and 41, respectively. The planar panels 33 and 34 have the locking devices 42 and 43, respectively. The full width panel 30 has two series of locking devices 45 and 46. Each of the locking devices is of the same construction and is formed by deforming a pair of flanges 50 and 51 from the plane of the planar panel with a cut between the two flanges whereby the flanges extend angularly toward each other and have their adjacent free ends formed with a minimal gap. When a fastener, such as a planar tab to be described, is inserted between the flanges 50 and 51, the insertion may occur readily by the flanges giving sufficiently to permit the insertion. The flanges prevent withdrawal of the fastener by the free ends thereof biting into the fastener. The locking devices, in addition to receiving and holding a fastener in the form of a tab can receive other types of fasteners encountered in constructing a building, such as a nail or screw.

Additionally, the basic element shown in FIGS. 2 and 3 has the central section thereof defined by the overlapped ends 36 and 37 formed with a series of spaced-apart receiving holes 55 for receiving elements, such as nails or bolts, and there is also a series of openings along the length thereof, such as the opening 56, providing for passage of structure, such as electric conduit, therethrough. The basic element shown in FIGS. 2 snd 3 can be provided in the variety of lengths required in use as studs, plates and sills, as well as in use in door and window framing wherein the basic element has differing lengths to form the components 60, 61 and 62 associated with framing the door and elements 63, 64 and 65 in framing a window. Additional variations in the basic element include variable strength requirements and this variable may be taken into account by selecting the gauge of material, such as sheet metal, that is to be used in forming the basic structural element.

A conventional type of connecting member, such as an L-shaped bar 70, is shown in association with the basic element in FIG. 2, wherein one leg of the bar can be attached to the basic element by a pair of bolts 71 extending through the receiving holes 55 in the central section of the basic element.

Unique to the building structural system disclosed herein are the members shown in FIGS. 6 to 8, each of which differ in basic shape but have integral fasteners associated therewith. The member 25, shown in FIG. 8, has a planar body 75 with a pair of fasteners in the form of planar tabs 76 and 77 struck out from the body of the member and extending at a right angle thereto. An additional pair of tabs 78 and 79 are struck out from the body 75 and are disposed in a plane at right angles to the plane of the tabs 76 and 77. The use of this member 25 is clearly illustrated in FIG. 1, wherein the tabs 76 and 77 may interconnect with a spaced pair of locking devices on one of the planar panels of the basic element as used as the stud 22 and with the tabs 78 and 79 fastening into locking devices of one or the other of the planar panels 33 and 34 of the sill member. The repeat pattern of the locking devices of the basic element is set so that use of a member 25 to interconnect basic elements used as studs 22 and the sill 20 will result in conventional spacing of the studs 22.

The member 26, shown in FIG. 7, has a planar body 80 with a pair of fastening tabs 81 and 82 struck out from the body thereof and lying in a plane which is at right angles to a tab 83 struck out from the body of the member. The use of the member 26 is shown in the lower right-hand corner of the building framing shown in FIG. 1.

A third member 27 is formed as an L-shaped member having a pair of legs 85 and 86 with the leg 85 having a pair of tabs 87 and 88 struck therefrom and the leg 86 having a pair of tabs 89 and 90 struck therefrom. The use of the member 27 is clearly shown in FIG. 1, with the 2 pairs of tabs being inserted into locking devices of a stud 22 and the plate 21.

A fragmentary view of a partially-completed building wall is shown in FIG. 9 wherein a pair of the studs 22 mounts a conventional type furring strip 100 by attachment thereof to the studs by a pair of nails 101 inserted into a pair of locking devices on one or the other of the planar panels 33 and 34 of the basic element. Also shown, is a relatively light C-shaped channel section 102 that can be carried by the studs by notching of the channel section at the location of intersection with the studs. The finish treatment of a portion of the wall is shown wherein a wall panel 110 and a floor panel 111 are mounted to the studs 22 and floor joists 115 and 116, respectively. One of the floor joists 115 is shown as being formed of a pair of the basic elements shown in FIGS. 2 and 3, while an alternate form of floor joist 116 is of the construction shown in FIG. 4. The floor joist 116 has a generally C-shape cross-section with a full width planar panel having a planar panel 117 and 118 at opposite edges thereof and with each of the latter planar panels having locking devices including flanges 119 and 120 extending in a spaced series along the length thereof and being of the same construction as the locking devices described in FIGS. 2 and 3.

The panelling 110 and 111 may be directly secured to the framing elements by nailing thereof with the nails entering the locking devices previously described. As an alternate and as shown in FIG. 12, a pair of panels, such as wall panels 110 may be secured in position by a special fastening device having a central web 125 spanning the gap between the panels and a fastener pin 126 extending therefrom at a series of locations along the length thereof for extension into a locking device having the flanges 50 and 51.

An additional use of the structural element 116, shown in FIG. 4, is in the roof structure of the building, particularly shown in FIGS. 1 and 10. In the build-up of the roof structure, a series of the elements 116 extend as rafters toward the high point of the roof. The lower ends of the rafters are fastened to studs 22 by a member 130 of the same basic construction as the member 27, shown in FIG. 6, but having the legs thereof at an angle slightly less than 90°, as viewed in FIG. 10, to take into account the angle between the rafters 116 and the studs 22.

Additional rafter braces 135 are shown in FIGS. 1 and 10 and are of planar material having a generally triangular shape and with fastening tabs extending therefrom for insertion into locking devices on the plate 27 and the rafters 116.

The possible conventional exterior finishing of the building is illustrated in FIG. 10 wherein panel members 140 and 141 of conventional drop siding type may be positioned extending horizontally and spanning the studs 22 and with the lower edge of each panel member carrying tabs 142 and 143 of a length to permit overlap of the panel members and with extension of the fastening tabs into locking devices on the stud 22.

An additional basic element 150 is shown in FIG. 5 which has a pair of planar panels 151 and 152 extending in opposite directions from opposite edges of a body part and with each of the planar panels 151 and 152 having the series of locking devices formed by the flanges 50 and 51. A series of these members are shown in FIG. 11 extending in spaced parallel relationship to a rafter 160 and supporting roofing material 161 with the elements 150 being secured to both the rafter and the roofing material by means of conventional fasteners, such as nails 162.

With the structure disclosed herein, components of the building structural system are inherently self-aligning with parts in conventional right-angular relation and being secured together by integral fastening components. The components can be placed in approximate alignment visually with final accurate positioning being assured by the inherent alignment required in associating fastener tabs with locking devices and with inherent strengthening from the members used to interconnect the basic elements.

I claim:

1. A building structural system comprising, a plurality of preformed elongate structural elements positionable in both angular and parallel interrelation with adjacent parts of elements in abutting relation, said elements including a sill element, a plate element, and a plurality of vertically extending stud elements each having a lower end directly engaging and supported by said sill element to define the basic wall frame of a building, each of said elements being of metal sheet material and having a box cross-section with a full width planar panel, a pair of planar panels in spaced parallel relation to said full width panel, and a pair of interconnecting planar panels, each of said planar panels having a series of uniformly spaced-apart fastener-receiving and locking devices and with each of said devices being comprised of a pair of flanges deformed from the planar panel to extend angularly toward each other with closely adjacent free ends and define a narrow elongate slot for receipt of a fastener, all of said series of devices having the same spacing between devices and all of said series of devices being uniformly interrelated to have a device from each planar panel at the same location lengthwise of the structural element, said plurality of stud elements having their interconnecting panels in a common plane with said interconnecting panels of said sill and plate elements to place a plurality of said fastenerreceiving and locking devices on the interconnecting panels of the stud elements, sill element and plate element in said common plane, and a plurality of members of different shapes interconnecting said elements in the desired interrelation and each having fasteners in the form of integral planar tabs extending therefrom and inserted into the slots of several ones of said locking devices and held against removal by said pairs of flanges, each of said planar tabs having a width substantially equal to the length of said slot to avoid play therebetween lengthwise of said slot.

2. A building structural system as defined in claim 1 including additional preformed elongate structural elements having a C-shape cross-section with a planar panel of the same width as the full width planar panel of said box cross-section element and a pair of planar panels one at each edge of the first-mentioned planar panel, said last-mentioned pair of planar panels each having a series of said fastenerreceiving and locking devices.

3. A building structural system as defined in claim 1 including additional preformed elongate structural elements having a planar panel of the same width as the full width planar panel of said box cross-section element and a pair of planar panels one at each edge of the first-mentioned planar panel and extending in opposite directions therefrom, said last-mentioned pair of planar panels each having a series of said fastener-receiving and locking devices.

4. A building structural system as defined in claim 1 wherein said plurality of members includes a member generally of an L-shape with a pair of legs and a pair of integral fasteners on each leg.

5. A building structural system as defined in claim 1 wherein said plurality of members includes a planar member and the protruding fasteners are outwardly extending planar tabs and with there being tabs lying in planes at right angles to each other.

* * * * *